(12) United States Patent
Hyun

(10) Patent No.: US 9,198,407 B2
(45) Date of Patent: Dec. 1, 2015

(54) FISHING REEL HAVING RELIABILITY IN OPENING SIDE COVER

(71) Applicant: DOYO ENGINEERING CO., LTD., Bucheon (KR)

(72) Inventor: Kwang-Ho Hyun, Bucheon (KR)

(73) Assignee: DOYO ENGINEERING CO., LTD. (KR)

( * ) Notice: Subject to any disclaimer, the term of this patent is extended or adjusted under 35 U.S.C. 154(b) by 11 days.

(21) Appl. No.: 14/097,519

(22) Filed: Dec. 5, 2013

(65) Prior Publication Data

US 2014/0158803 A1 Jun. 12, 2014

(30) Foreign Application Priority Data

Dec. 7, 2012 (KR) .................... 10-2012-0141880

(51) Int. Cl.
*A01K 89/015* (2006.01)
(52) U.S. Cl.
CPC .................... *A01K 89/015* (2013.01)
(58) Field of Classification Search
CPC .................... A01K 89/015; A01K 89/033
USPC .......................... 242/310, 313–315
See application file for complete search history.

(56) References Cited

U.S. PATENT DOCUMENTS

| | | | | |
|---|---|---|---|---|
| 5,370,331 A * | 12/1994 | Sato | ........................... | 242/313 |
| 6,032,894 A * | 3/2000 | Chapman et al. | ............. | 242/310 |
| 6,206,312 B1 * | 3/2001 | Oh | ................................ | 242/314 |
| 6,293,484 B1 * | 9/2001 | Oh | ................................ | 242/312 |
| 6,367,726 B1 * | 4/2002 | Hyon | ........................... | 242/314 |
| 6,460,793 B1 * | 10/2002 | Hirayama et al. | ............. | 242/313 |
| 7,150,423 B2 * | 12/2006 | Kawasaki | .................... | 242/310 |
| 8,235,320 B2 * | 8/2012 | Kawasaki | .................... | 242/310 |
| 2003/0111569 A1 * | 6/2003 | Hitomi | ........................ | 242/321 |
| 2004/0079822 A1 * | 4/2004 | Kawasaki | .................... | 242/322 |
| 2005/0056716 A1 * | 3/2005 | Kawasaki | .................... | 242/310 |
| 2005/0224617 A1 * | 10/2005 | Nakagawa et al. | ........... | 242/310 |
| 2007/0246590 A1 * | 10/2007 | Hyun | .......................... | 242/310 |
| 2011/0315803 A1 * | 12/2011 | Hlava et al. | .................. | 242/310 |
| 2013/0320125 A1 * | 12/2013 | Hyun | .......................... | 242/312 |

FOREIGN PATENT DOCUMENTS

| | | |
|---|---|---|
| KR | 200345065 | 3/2004 |
| KR | 200345066 | 3/2004 |
| KR | 100652842 | 11/2006 |

\* cited by examiner

*Primary Examiner* — Emmanuel M Marcelo
(74) *Attorney, Agent, or Firm* — Cantor Colburn LLP

(57) ABSTRACT

Provided is a fishing reel having reliability in opening a side cover. The fishing reel is configured such that when the side cover opens, the side cover hangs from the reel body rather than being completely separated from the reel body, so that the user can easily open the side cover even when standing on uneven terrain such as on the rocks of a seashore. The fishing reel has a pillar structure which can conduct a first-extraction and second rotation operation such that even when the reel is designed in such a way that an end of the spool shaft necessarily protrudes out of the reel body, a rotating and opening operation of a cover assembly including the spool cover and the side cover is prevented from be impeded by the shaft, whereby even when in an extreme fishing environment, reliability in opening the side cover can be ensured.

2 Claims, 19 Drawing Sheets

FISHING REEL HAVING RELIABILITY IN OPENING SIDE COVER

BACKGROUND OF THE INVENTION

1. Field of the Invention

The present invention relates generally to fishing reels having reliability in opening side covers and, more particularly, to a fishing reel having reliability in opening a side cover which is configured such that when the side cover opens to allow for a user to handle the spool, for example, separate the spool from the reel, the side cover hangs from the reel body rather than being completely separated from the reel body, so that the user can open the side cover without worry of dropping the side cover, even when the user is unsure or his or her footing, such as when standing on rocks on a seashore, and which has a pillar structure which can conduct a first-extraction and second rotation operation such that, under conditions in which a first end of a shaft of the spool is coupled to the reel body and a second end thereof is coupled to the spool cover, even when the reel is designed in such a way that the second end of the spool shaft necessarily protrudes out of the reel body to meet requirements for lightness, thinness, shortness and smallness of the fishing reel, a rotating and opening operation of a cover assembly including the spool cover and the side cover is prevented from be impeded with the second end of the shaft, whereby even when in extreme fishing environments, the reliability in opening the side cover can be ensured.

2. Description of the Related Art

An example of conventional techniques pertaining to coupling and removal of a cover of a fishing reel was proposed in Korean Patent Registration No. 10-0652842 (Registration date: Nov. 24, 2006).

This conventional technique relates to an apparatus for coupling a bait casting reel cover which is configured such that a reel cover can be coupled to a reel body or separated therefrom only by rotating the reel cover relative to the reel body with predetermined force without using a separate locking device.

The reel body has an opening 15 at a first side. A spool, around which a fishing line is wound, is rotatably installed in the reel body. The reel cover supports the spool such that the spool can rotate. The reel cover closes the opening 15 or opens it so as to allow the spool to be removed from the reel body, for example, when the fishing line is entangled. The conventional apparatus further includes a spool cover which is provided in the reel cover and to which a first end of the spool is rotatably inserted, a fixing pin which protrudes out of the opening 15 in the same direction as a rotating shaft of the spool, a rotation prevention unit which is disposed in the reel cover to restrict movement of the fixing pin, and a locking means which locks or releases the reel cover in such a way that when a user grips the reel body with one of his/her hands and rotates the reel cover relative to the reel body with the other hand, movement of the fixing pin is restricted within a predetermined elasticity limit range while movement of the fixing pin is allowed beyond the elasticity limit range.

However, in this conventional technique, when the reel cover is opened, the reel cover is completely separated from the reel body. In an extreme fishing environment such as on rocks of the seashore, there is the possibility of the reel cover being lost during operation of replacing the spool with a new one.

SUMMARY OF THE INVENTION

Accordingly, the present invention has been made keeping in mind the above problems occurring in the prior art, and an object of the present invention is to provide a fishing reel having reliability in opening a side cover which includes a pillar which is connected to a second coupling part provided on the reel and makes possible a cover assembly including a spool cover and a side cover to be opened from a reel body in a first-extraction and second-rotation manner, whereby when the cover assembly is opened, it is not completely removed from the reel body, so that even if operation of replacing a spool with a new one is conducted in an extreme fishing environment such as on the rocks of a seashore, there is no possibility of the cover assembly being lost.

Another object of the present invention is to provide a fishing reel having reliability in opening the side cover in which the pillar has a telescopic structure to be expanded and contracted so that the space needed for movement of the pillar can be easily provided even if a separate space for first-extraction and second-rotation operation of the pillar is not formed in the reel body, thus facilitating the process of manufacturing the fishing reel.

A further object of the present invention is to provide a fishing reel having reliability in opening the side cover which includes a guide member which guides arc-movement of the pillar such that when the cover assembly is rotated by the rotation of the side cover, the cover assembly is prevented from being impeded with the pillar, whereby the user can conveniently separate the cover assembly from the reel body.

Still another object of the present invention is to provide a fishing reel having reliability in opening the side cover which further includes a coupling protrusion which is provided on the spool cover or a first coupling part of the reel body, and a corresponding coupling member to which the coupling protrusion is coupled, whereby the cover assembly including the side cover can be reliably coupled to the reel body, and when needed, the user can easily separate the cover assembly from the reel body, and which further includes a grip part which is used to rotate the spool cover, thus promoting user convenience.

In order to accomplish the above object, the present invention provides a fishing reel having reliability in opening a side cover, including: a reel body comprising a first shaft support part disposed at a first side, an opening formed at a second side, a first coupling part provided around the opening, a second coupling part provided around the opening, and a fishing line unwinding part disposed at a front side; a cover assembly fixed to the coupling part of the reel body, the cover assembly comprising a spool cover provided with a second shaft support part, and a side cover coupled to the spool cover, the side cover covering the opening of the reel body; a spool installed in the reel body and provided with a shaft coupled at opposite ends thereof to the first and second shaft support parts, a fishing line being wound around the spool; a locking means to keep the side cover in a closed position covering the opening; and a pillar coupled to the second coupling part of the reel body to connect the reel body to the cover assembly, the pillar making it possible for the cover assembly to be extracted and then rotated in such a way that when a locked state of the locking means is released, the cover assembly is laterally moved towards a second side of the opening of the reel body and then rotated to be opened before being separated from the first coupling part of the reel body.

The pillar may include a plurality of pillar bodies coupled to each other in such a way that the pillar bodies are expanded and contracted in a telescopic manner.

The cover assembly may be configured such that the spool cover is rotated around the shaft of the spool by first-rotation of the side cover. The cover assembly may further include a guide member provided in the side cover, the guide member receiving the pillar and guiding arc movement of the pillar in response to the first-rotation of the side cover.

The cover assembly may be configured such that the spool cover is rotated around the shaft of the spool by first-rotation of the grip part coupled to the spool cover. The locking means may include a coupling protrusion provided on the spool cover or the coupling part of reel body, and a corresponding coupling member to which the coupling protrusion is coupled.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1A:
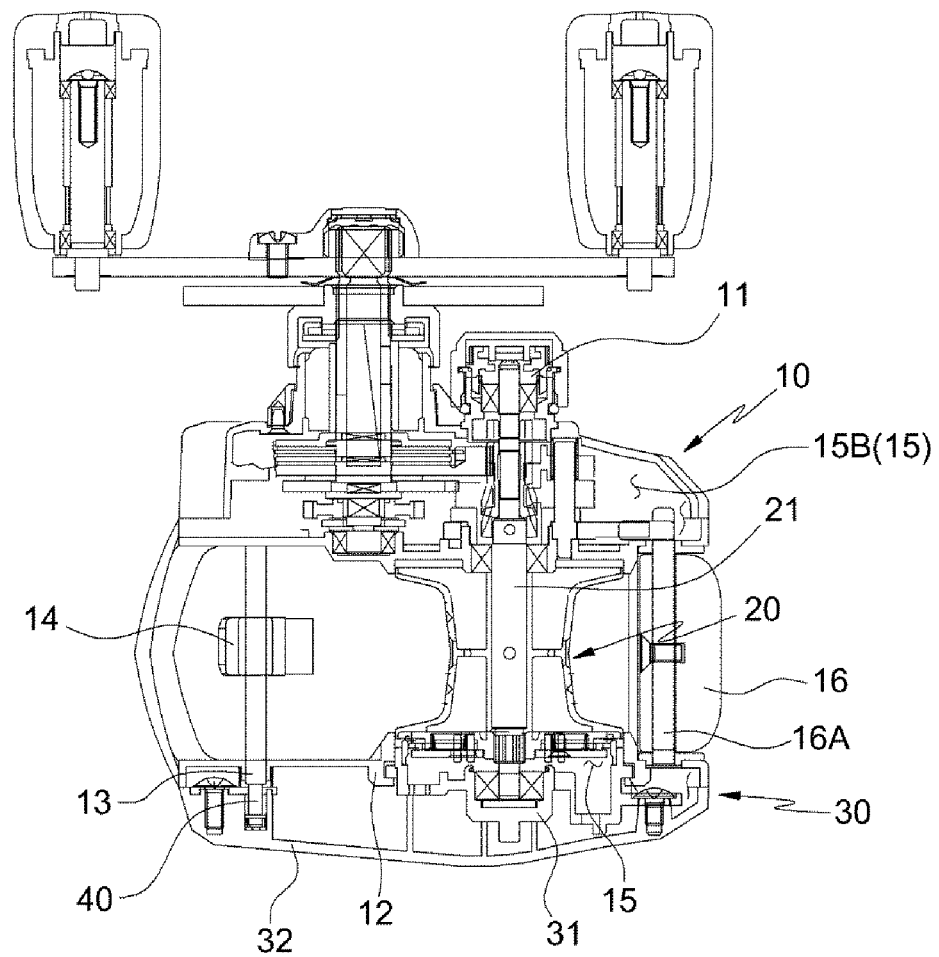
FIGS. 1A through 3B are plan views and side views illustrating the operation of a fishing reel according to a first embodiment of the present invention.

Hereinafter, the present invention will be described in detail with reference to the attached drawings. This invention may, however, be embodied in many different forms, and should not be construed as limited to the embodiments set forth herein. Rather, all changes that fall within the bounds of the present invention, or the equivalence of the bounds are therefore intended to be embraced by the present invention.

The same reference numerals throughout the drawings, that is, the same reference numerals for the second digit or the first digit, or for the second digit, the first digit and a letter of the alphabet, denote elements having the same function. If not specifically mentioned otherwise, the elements denoted by the reference numerals are to be assumed to comply with the above-mentioned reference scheme.

In the drawings, the thicknesses of lines or the sizes of elements may be exaggerated or simplified to more clearly and conveniently illustrate the present invention, but the bounds of the present invention must not be interpreted as being limited thereto.

The terminology used herein is for the purpose of describing particular embodiments only and is not intended to be limiting. As used herein, the singular forms "a," "an" and "the" are intended to include plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The ordinal numerals "first", "second", "third", etc. are used only for the sake of description and they categorically do not impose a limit on the order of production.

In the following description of a fishing reel having reliability in opening a side cover according to the present invention, for the sake of description, approximate direction reference of up, down, left and right is defined based on the side view of FIG. 1A and FIG. 1B. With reference to the plan view of FIG. 1A and FIG. 1B, a direction in which a shaft of a spool is oriented is designated as the lateral direction and a direction perpendicular to the lateral direction is designated as the longitudinal direction. Further, a side at which an unwinding part is disposed is designated as the front side, and the opposite side is designated as the rear side.

Furthermore, in the following description of the fishing reel according to the present invention, the term "fishing reel" refers to a reel which is used, particularly, for bait casting fishing. Because a handle used to wind or unwind a fishing line, gears connected to the handle and an operation method of the gears, a casting breaking means, a handle rotation prevention means, etc. are not directly related to intrinsic characteristics of the present invention, detailed explanation of such elements will be omitted in this specification for the sake of the description of the present invention. Those skilled in this art will easily understand such general construction of a fishing reel, particularly, a bait casting fishing reel.

Bait casting fishing, for which the fishing reel according to the present invention is used, is a type of fishing which is carried out in such a way that a user, on a breakwater or the rocks of the seashore, casts a lure or the like towards a desired fishing point.

According to the kind of target fish, the fishing point towards which the lure is cast varies, and the thickness and length of the fishing line also vary.

A part around which the fishing line is wound is called a spool. Since there are of fishing lines of various thicknesses and lengths, the kind and thickness of the spool also vary according to the kind of fishing line.

Therefore, typically, users who enjoy fishing prepare several kinds of spools in response to the kinds of fishing lines and replace a spool with a desired one according to the kind of target fish.

Furthermore, with regard to a long fishing point, the fishing line may be entangled or broken by target fish. In this case, a user must open the side cover of the reel for replacement or maintenance of the spool.

However, as stated above, because of characteristics of bait casting fishing, it is typically carried out on an uneven terrain such as on the rocks of a seashore. Because of unstable posture, there is the possibility of the side cover being lost during the maintenance or replacement of the spool.

In addition, manufacturers for fishing reels may make fishing reels such that the shaft of the spool inevitably protrudes towards the side cover to satisfy requirements for lightness, thinness, shortness and smallness of the fishing reel because of characteristics of fishing, particularly, bait casting fishing. In this case, it is difficult to couple the side cover to the reel body or remove it therefrom, so that a process of manufacturing the fishing reel is complicated.

In an effort to overcome the above-mentioned problems, the present invention provides a fishing reel having reliability in opening a side cover which is configured such that operation of opening a cover assembly including a side cover and a spool cover is conducted by first-extraction and second-rotation operation of the cover assembly, whereby there is no possibility of the side cover being lost when a user carries out maintenance of the spool, and a manufacturer can easily manufacture a light, thin, short and small fishing reel.

Hereinafter, a fishing reel having reliability in opening a side cover according to the present invention will be described in detail with reference to the attached drawings.

As shown in FIGS. 1A through 4B, the fishing reel according to the present invention includes a reel body 10, a cover assembly 30, a spool 20 and a locking means.

The reel body 10 includes a first shaft support part 11 which is disposed at a first side, an opening 15 which is formed at a second side, a first coupling part 12 which is provided around the opening 15, a second coupling part 13 which is provided around the opening 15, and a fishing line unwinding part (not shown) which is disposed at the front side.

The cover assembly 30 includes a spool cover 31 which is provided with a second shaft support part 31A, and a side cover 32 which is coupled to the spool cover 31 and covers the opening 15 of the reel body 10. The cover assembly 30 is fixed to the first coupling part 12 of the reel body 10.

The spool 20 is installed in the reel body 10 and includes a shaft 21 which is coupled at opposite ends thereof to the first and second shaft support parts 11 and 31A. A fishing line is wound around the spool 20.

The locking means keeps the side cover 32 in a closed position covering the opening 15.

Figure 2A:
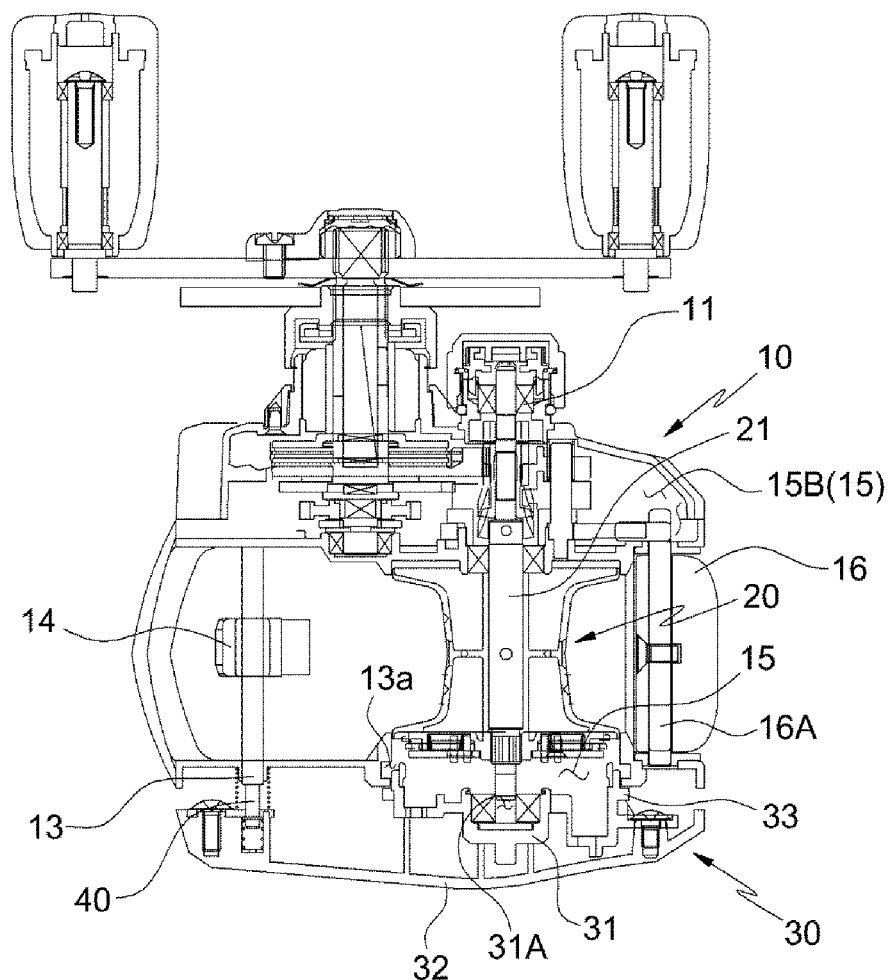
Figure 2B:
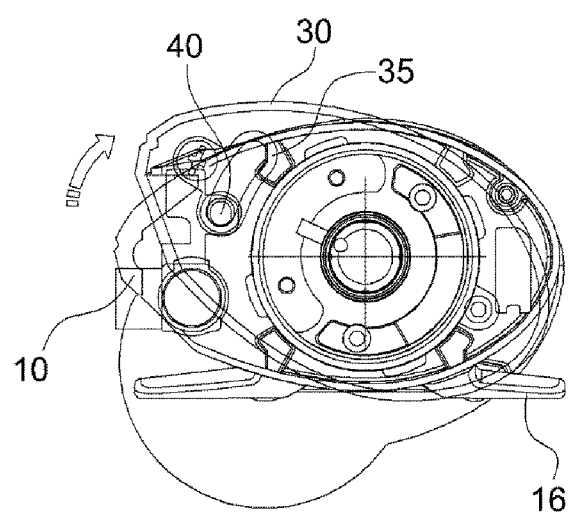
Figure 3A:
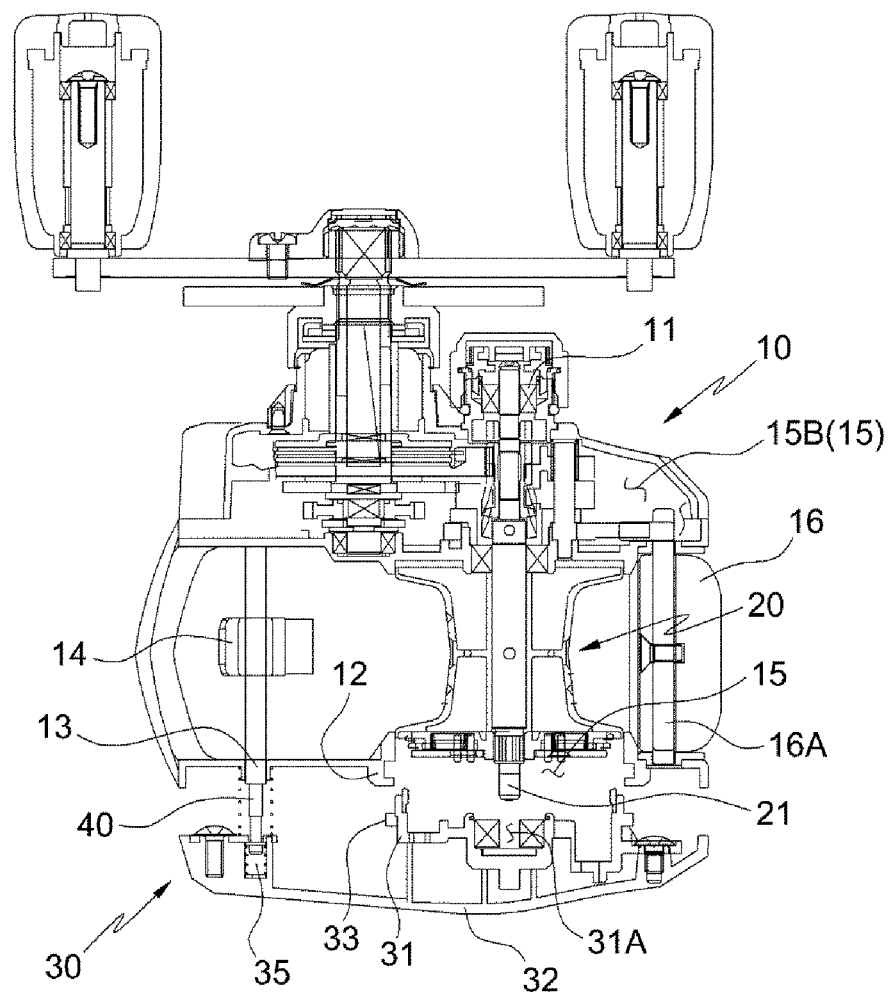
Figure 3B:
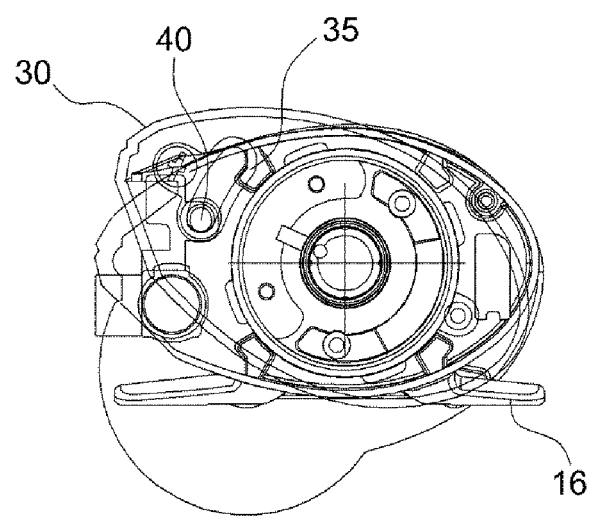
Figure 4A:
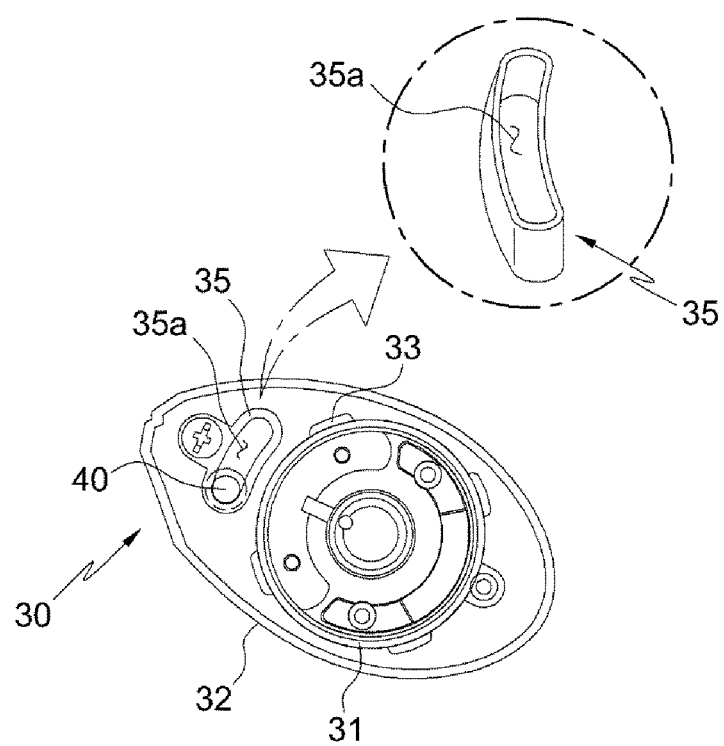
FIGS. 4A and 4B illustrate a cover assembly of the fishing reel according to the first embodiment of the present invention.
Figure 4B:
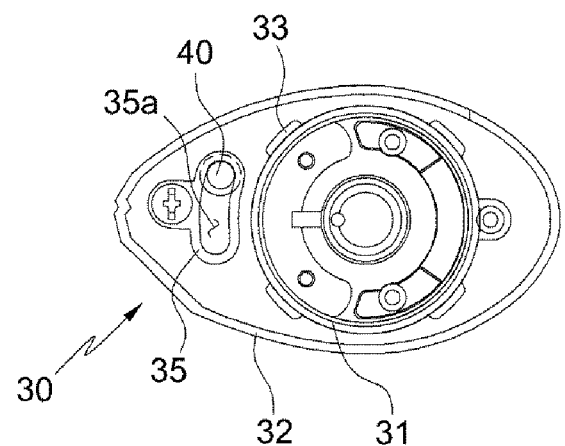

FIGS. 1A through 3B are plan views and side views illustrating the operation of the fishing reel according to a first embodiment of the present invention. FIG. 4A and FIG. 4B illustrate the cover assembly 30 of the fishing reel.

A first end of the shaft 21 of the spool 20 is disposed in the first shaft support part 11 of the reel body 10. The first shaft support part 11 includes a plurality of gears which are connected to the first end of the shaft 21 and the handle of the reel so that rotation of the shaft 21 is interlocked with the handle, and a breaking means for preventing a backlash phenomenon when casting.

The opening 15 is formed at the side opposite to the first shaft support part 11 of the reel body 10. The spool 20 is coupled to the shaft 21 through the opening 15. The first coupling part 12 for installation of the cover assembly 30 which includes the spool cover 31 and the side cover 32 is provided around the opening 15.

The fishing line unwinding part (not shown) which is called a level winder is provided in the front end of the reel body 10. The fishing line unwinding part (not shown) has a guide through which the fishing line that is wound around the spool 20 is guided towards a top portion of a fishing rod to which the fishing reel of the present invention is mounted.

The reel body 10 includes a rotating shaft which is rotatably provided in the lateral direction for long distance casting. The rotating shaft has a bidirectional threaded part on an outer circumferential surface thereof so that the guide of the fishing line unwinding part (not shown) can slide back and forth in the lateral direction.

By virtue of lateral sliding movement of the fishing line unwinding part (not shown), the fishing line which is wound around the spool 20 can be uniformly distributed around the spool 20 with respect to the lateral direction.

Furthermore, a hand brake unit 16 which is called a thumb bar or a clutch is provided in the rear end of the reel body.

The hand brake unit is a device which enables a user to control rotation of the spool using his/her finger. The hand brake unit functions to prevent a backlash phenomenon when casting and makes it possible for the user to control the spool while fishing.

The hand brake unit includes a push bar which is pushed by the thumb of the user when it is required to brake the spool, and a push shaft around which the push bar is swung (rotated towards the spool).

In FIGS. 1A through 3B and 6A through 8B, although the fishing line unwinding part and the hand brake unit are omitted for the sake of explanation, those skilled in this art will easily understand the construction thereof.

The spool 20 around which the fishing line is wound is provided on the shaft 21 so that the spool 20 can be rotated. The first end of the shaft 21 is coupled to the first shaft support part 11 of the reel body 10. The second end of the shaft 21 is coupled to the cover assembly 30, in detail, to a second shaft support part 31A that is formed in the spool cover 31 installed in the side cover 32.

In the fishing reel according to the present invention, the cover assembly 30 and the reel body 10 are coupled to each other by the locking means. The locking means will be described in detail later herein.

The fishing reel according to the present invention further includes pillar 40 which is coupled to the second coupling part 13 of the reel body 10 to connect the reel body 10 to the cover assembly 30. The pillar 40 makes it possible for the cover assembly 30 to be extracted and then rotated, in other words, makes the cover assembly 30 be operated in such a way that when the locked state of the locking means is released, the cover assembly 30 is laterally moved towards the second side of the opening 15 of the reel body 10 and then rotated to be opened before being separated from the first coupling part 12 of the reel body 10.

Figure 5:
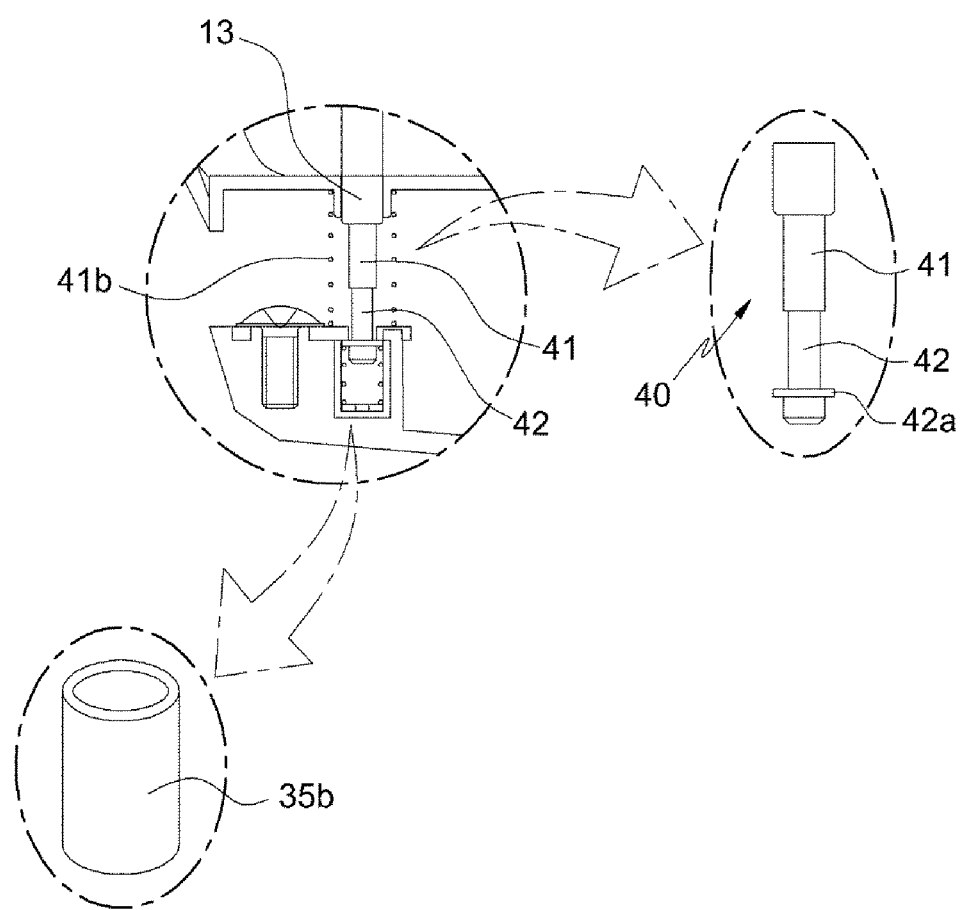
FIG. 5 is an enlarged view of a critical portion of the fishing reel according to the first embodiment of the present invention.
Figure 6A:
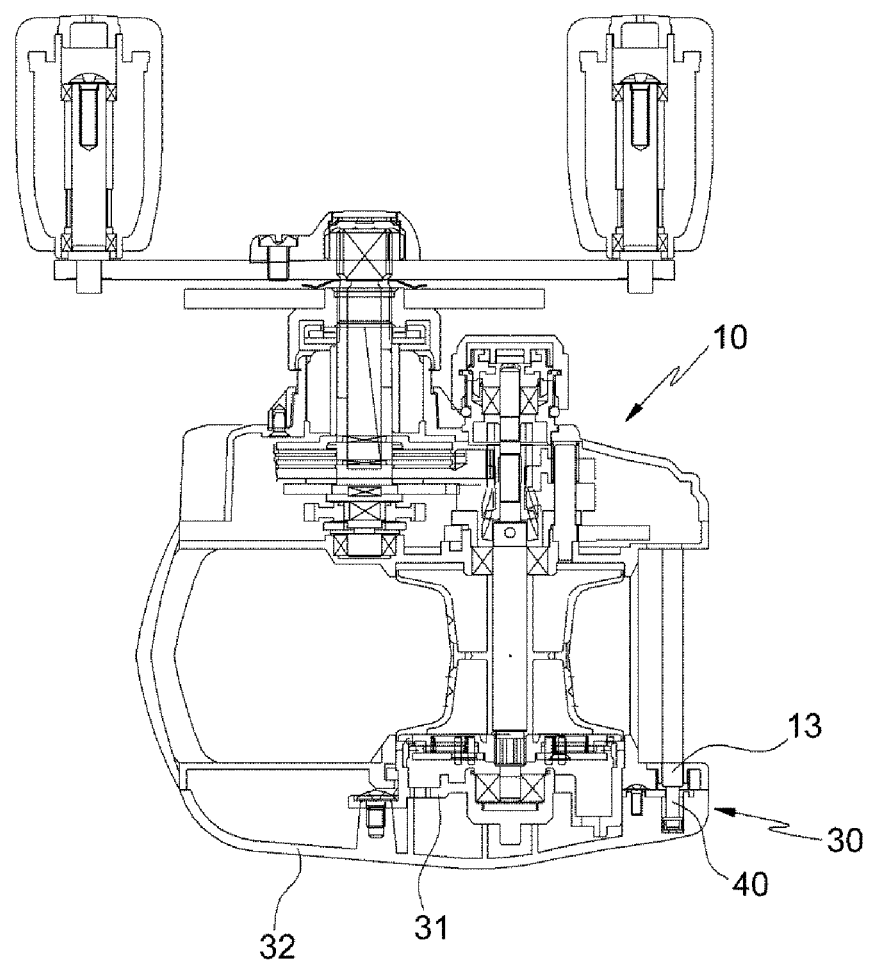
FIGS. 6A through 8B are plan views and side views illustrating the operation of a fishing reel according to a second embodiment of the present invention.
Figure 6B:
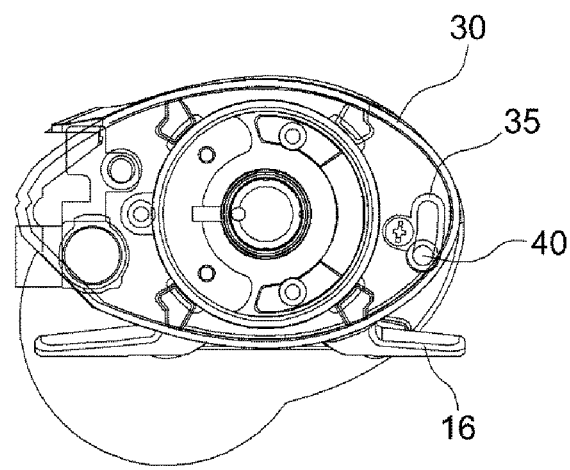

The pillar 40 is a crucial element of the present invention. As shown in FIG. 5, the pillar 40 is formed of a plurality of bodies, including a first pillar body 41 and a second pillar body 42.

FIG. 5 is an enlarged view of a junction between the pillar 40 and the cover assembly 30, particularly, the side cover 32.

It is preferable that the outer diameter of the first pillar body 41 be different from that of the second pillar body 42.

A first end of the first pillar body 41 is coupled to the second coupling part 13. A locking protrusion 42a is provided on an end of the second pillar body 42 so that the second pillar body 42 is coupled by the locking protrusion 42a to a guide member. This will be explained in more detail later herein.

As shown in FIGS. 1A through 4B, the spool cover 31 of the fishing reel according to the present invention further includes a breaking means for braking rotation of the spool 20.

The breaking means functions to prevent a backlash problem in which when casting, because the rotating speed of the spool 20 is higher than a speed at which the fishing line is unwound, the fishing line is entangled or a lure is not cast to a desired distance.

The breaking means can be embodied by various kinds of means. As representative example of the breaking means, there are a breaking means using magnetic force and a breaking means which is operated in such a way that a frictional member is moved by centrifugal force and the rotation of the spool 20 is decelerated by frictional force generated between the spool 20 and the frictional member.

With regard to this, a backlash prevention device which was proposed in Korean Utility Model Registration No. 20-0345065 or No. 20-0345066 which was filed by the applicant of the present invention is preferably used to alleviate difficulties caused in fishing and enhance the pleasures of fishing.

The operation of the fishing reel according to the present invention will be explained in detail with reference to the attached drawings. FIGS. 1A through 3B successively illustrate the operation of opening the cover assembly 30 according to the present invention first embodiment of the present invention. Of course, the operation of closing the cover assembly 30 is conducted in reverse order.

Figure 1B:
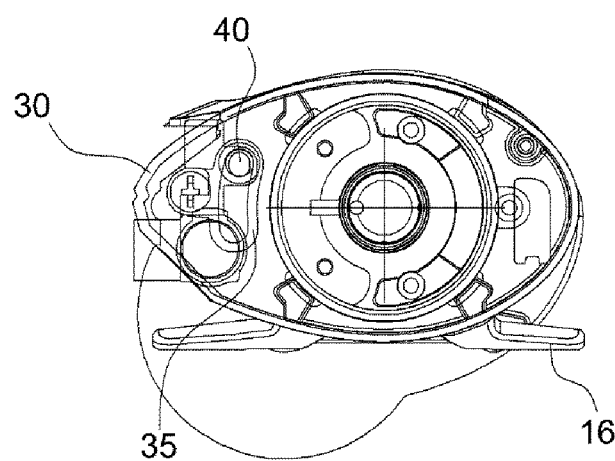

As shown in FIGS. 1A and 5, the side cover 32 of the cover assembly 30 has an insert coupling part into which the locking protrusion 42a provided on the end of the second pillar body 42 of the pillar 40 is inserted.

The pillar 40 is coupled to the second coupling part 13 of the reel body 10 and is slidably inserted into the insert coupling part to close the cover assembly 30.

Here, the closure of the cover assembly 30 is realized by the locking means, as stated above. The locking means includes coupling protrusions 33 which are provided on either the spool cover 31 or the side cover 32 or both of them and the first coupling part 12 of the reel body 10, and corresponding coupling members 13a which are coupled to the coupling protrusions 33.

The shapes, numbers and locations of the coupling protrusions 33 and the corresponding coupling members 13a are not limited to those of this specification, and those skilled in this art will easily embody them.

As shown in FIG. 2A and FIG. 2B, in the fishing reel according to the present invention, the locked state of the locking means is released by rotating the cover assembly 30, in detail, the side cover 32, in one direction.

Preferably, the spool cover 31 is fixed to the side cover 32 so that the spool cover 31 can rotate along with the side cover 32.

Therefore, in the cover assembly 30, as the side cover 32 first rotates, the spool cover 31 is rotated around the shaft 21 of the spool 20.

Here, because the pillar 40 is coupled to the side cover 32, if only the insert coupling part corresponding to the shape of the first pillar body 41 of the pillar 40 is provided in the side cover 32, the rotation of the side cover 32 is impossible.

Given this, the side cover 32 preferably includes a guide member 35 which receives the pillar 40 and guides arc movement of the pillar 40 in response to the first-rotation of the side cover 32.

As shown in the perspective view of FIG. 4A, the guide member 35 has a guide slot 35a that has a shape corresponding to the arc movement of the side cover 32. Preferably, a locking depression to which the locking protrusion 42a of the pillar 40 is locked is formed in the inner most side of the guide slot 35a.

After the locked state of the locking means has been released by the first rotation of the side cover 32, the cover assembly is moved in the lateral direction towards the second side of the opening 15 of the reel body 10.

To assist the lateral movement of the cover assembly 30, the first pillar body 41 of the pillar 40 further includes an elastic support means which is provided between the guide member 35 of the side cover 32 and the second coupling part 13 of the reel body 10.

The elastic support means can be embodied in various ways by various kinds of elastic bodies. In this embodiment, as shown in the drawings, a first coil spring 41b is used as the elastic support means.

Therefore, thanks to the elastic force of the first coil spring 41b, the cover assembly 30 can be moved in the lateral direction only by the first rotation of the side cover 32.

After the lateral movement of the cover assembly 30, in other words, after the extraction of the cover assembly 30, the side cover 32 is secondly rotated around the pillar 40 so that the cover assembly 30 including the side cover 32 and the spool cover 31 can open.

Moreover, as stated above, to meet requirements for lightness, thinness, shortness and smallness of the fishing reel, the shaft 21 of the spool 20 protrudes from the reel body 10 towards the spool cover 31.

If the length to which the shaft 21 protrudes is comparatively long, the lateral movement distance of the cover assembly 30 must be as long as the shaft 21 to make it possible to rotate and open the cover assembly 30. Therefore, it is preferable that the fishing reel of the present invention be configured such that after the primary lateral movement illustrated in FIG. 2A and FIG. 2B is conducted, the secondary lateral movement can be performed, as shown in FIG. 3A and FIG. 3B.

For this, the pillar 40 has a telescopic structure so that the expansion and contraction of the pillar 40 is possible.

In detail, the first pillar body 40 and the second pillar body 42 of the pillar 40 have different outer diameters. Particularly, the outer diameter of the second pillar body 42 is less than that of the first pillar body 41, and the second pillar body 42 is slidably disposed in the first pillar body 41. Thereby, the first-extraction and second-rotation of the cover assembly can be embodied without providing separate space for the second pillar body 42 in the second coupling part 13. This provides a manufacturer with a wider range of choices in design of the product.

Furthermore, to assist the secondary lateral movement, in the same manner as the first pillar body 41, the second pillar body 42 is provided with an elastic means which is provided around the second pillar body 42 and disposed in the guide slot 35a of the guide member 35.

Preferably, an elastic body is used as the elastic means provided around the second pillar body 42. The elastic body comprises a coil spring (hereinafter, referred to as a second coil spring) in the same manner as that of the first coil spring 41b.

If the second coil spring is present, when the first rotation of the side cover 32 is conducted, it may not be smooth or noise may occur.

Figure 7A:
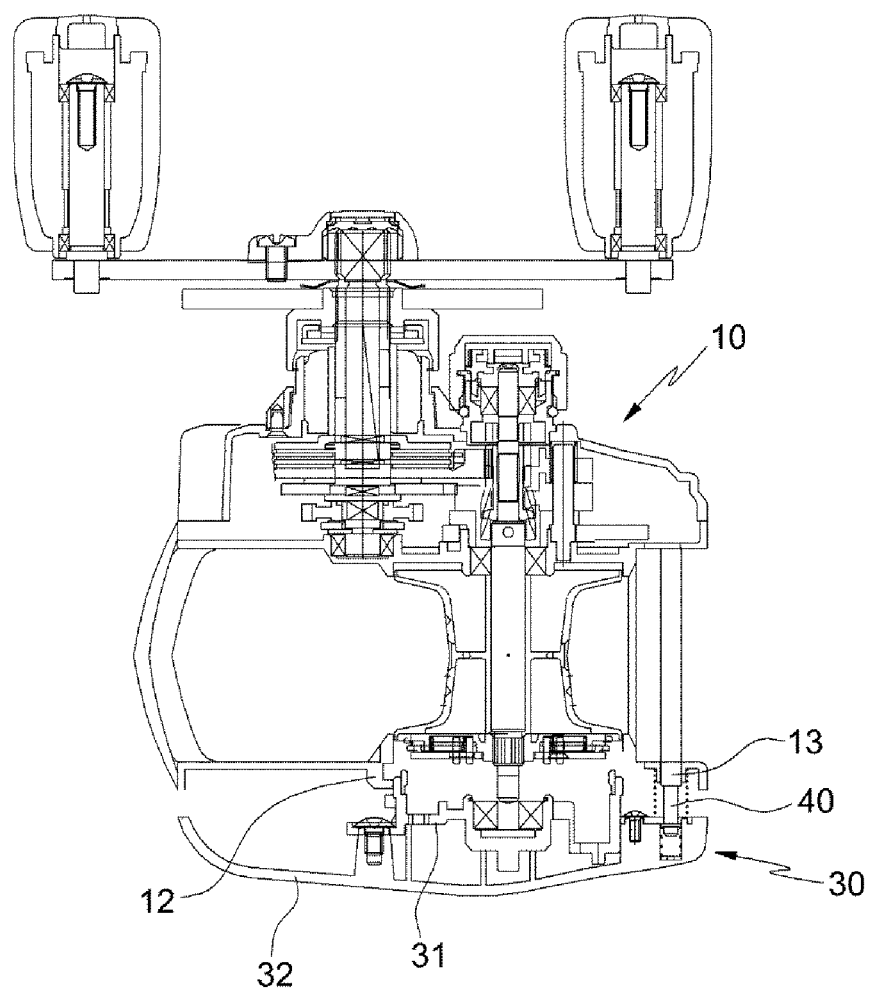
Figure 7B:
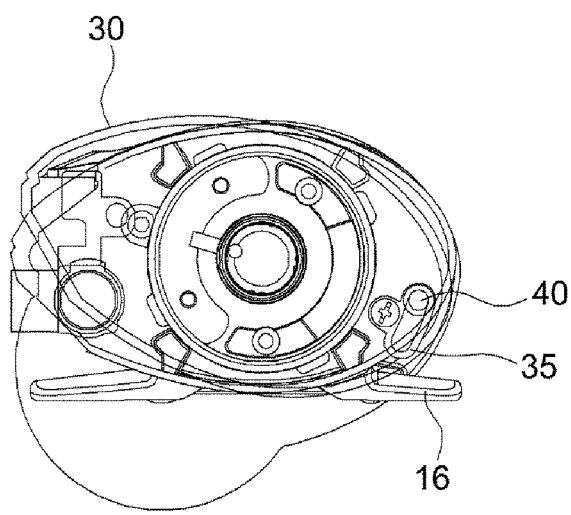
Figure 8A:
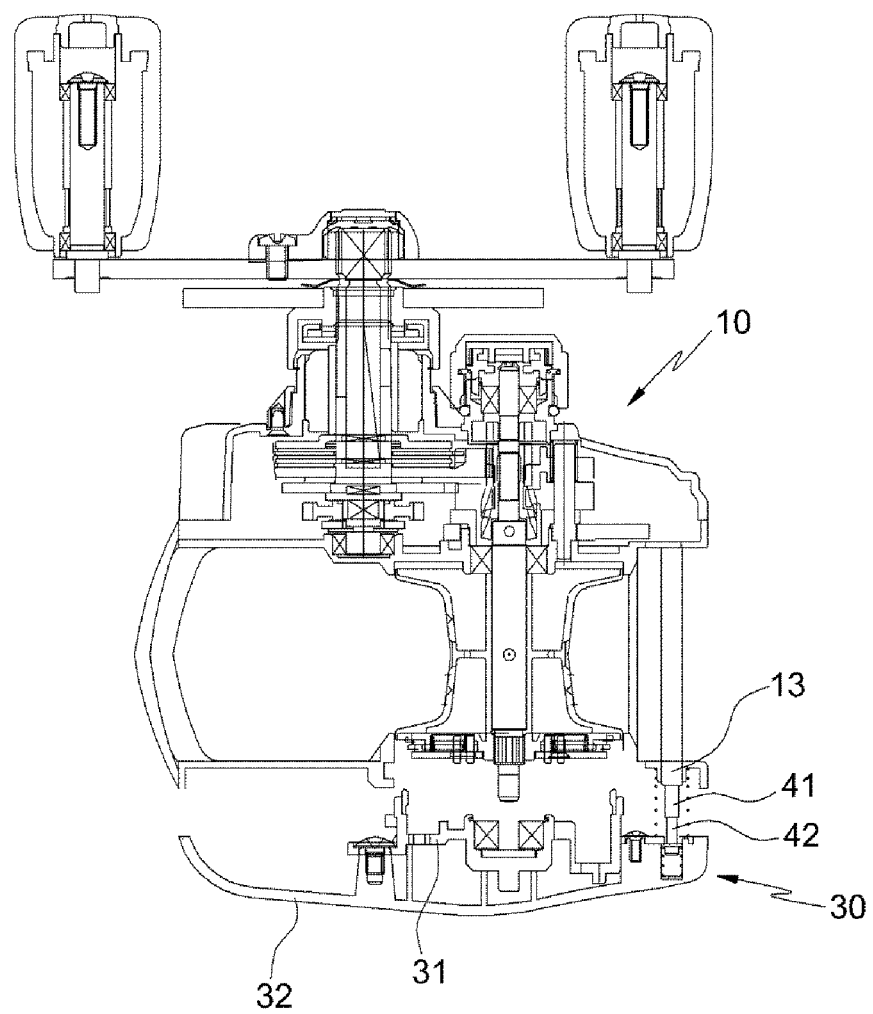
Figure 8B:
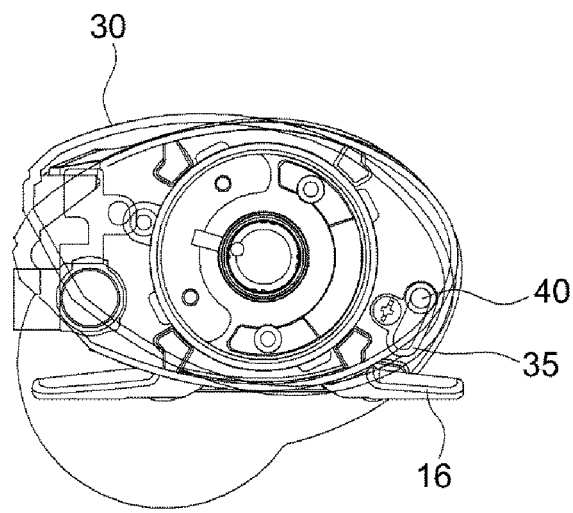

Give this, as shown in FIG. 7A and FIG. 7B. it is preferable that a tubular friction prevention member 35b be provided between the guide member 35 and the second coil spring.

The friction prevention member 35b functions as a kind of bearing to prevent resistance of the second coil spring when the first rotation of the side cover 32 is conducted.

Furthermore, in the present invention, the pillar has a telescopic structure, so that the first pillar body and the second pillar body can be expanded and contracted. Therefore, the second coil spring which applies elastic force to the second pillar body 42 may be omitted.

Although the second coil spring is omitted, the friction prevention member 35b functions to prevent friction between the first pillar body 42 and the guide member 35 and, particularly, prevent the second pillar body 42, the outer diameter of which is less than that of the first pillar body 41, from being damaged.

Of course, the fishing reel according to the present invention may be configured such that the cover assembly 30 opens in such a way that the first-extraction and second-rotation operation is conducted only with respect to the primary lateral movement. Here, as stated above, if the protrusion length of the shaft 21 is comparatively long, the distance that the cover assembly 30 moves in the lateral direction towards the second side must be increased. This involves an increase in length of the first pillar body or the second pillar body, thus not meeting the requirements for the lightness, thinness, shortness and smallness of the fishing reel.

In addition, the appearance of the reel body 10, which is an important consideration when purchasing a fishing reel, may be deteriorated, given the fact that recently consumers prefer not only a light, thin, short and small structure but also designs with a thin and sharp front end of the reel body 10 like that of the front end of a sports car, whereby the front ends of the reel bodies of almost all products in market have thin oval shapes, as shown in the side views of the drawings. Therefore, it is preferable that the opening of the cover assembly be conducted in the two-stage lateral movement manner, as described above.

Hereinafter, a fishing reel having reliability in opening a side cover according to a second embodiment the present invention will be described in detail with reference to FIGS. 6A through 9.

Figure 9:
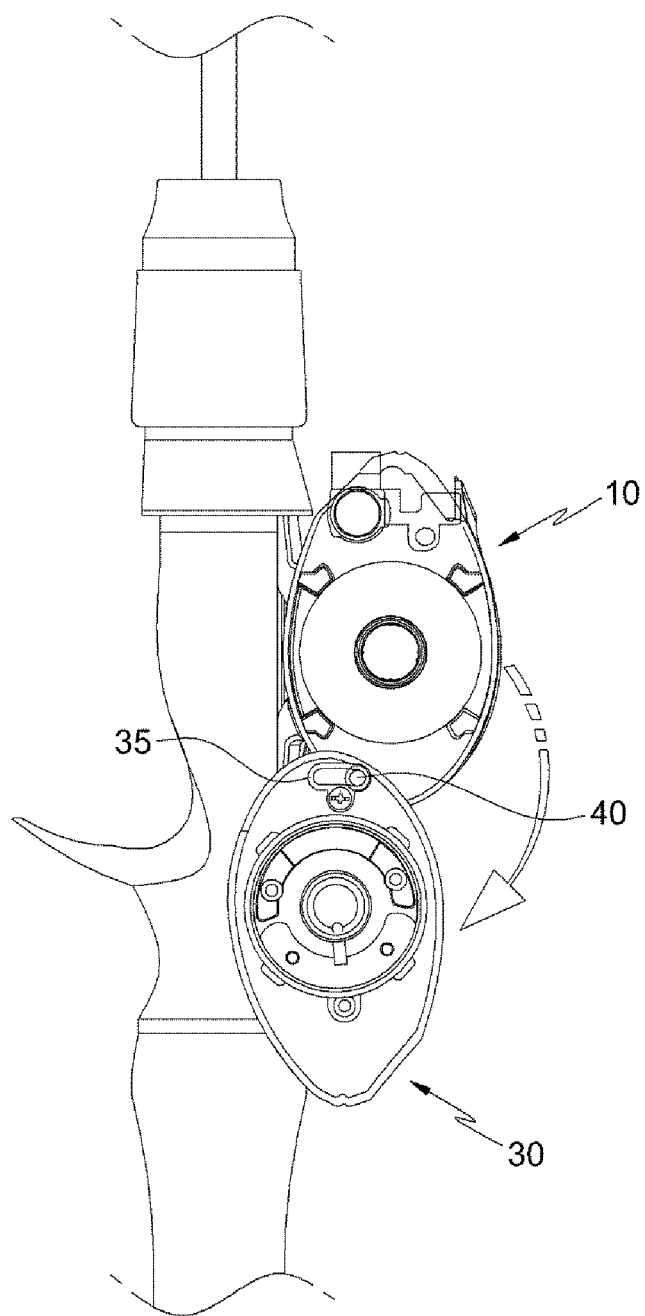
FIG. 9 is a side sectional view showing operation completion conditions of the fishing reel according to the second embodiment of the present invention.
Figure 10:
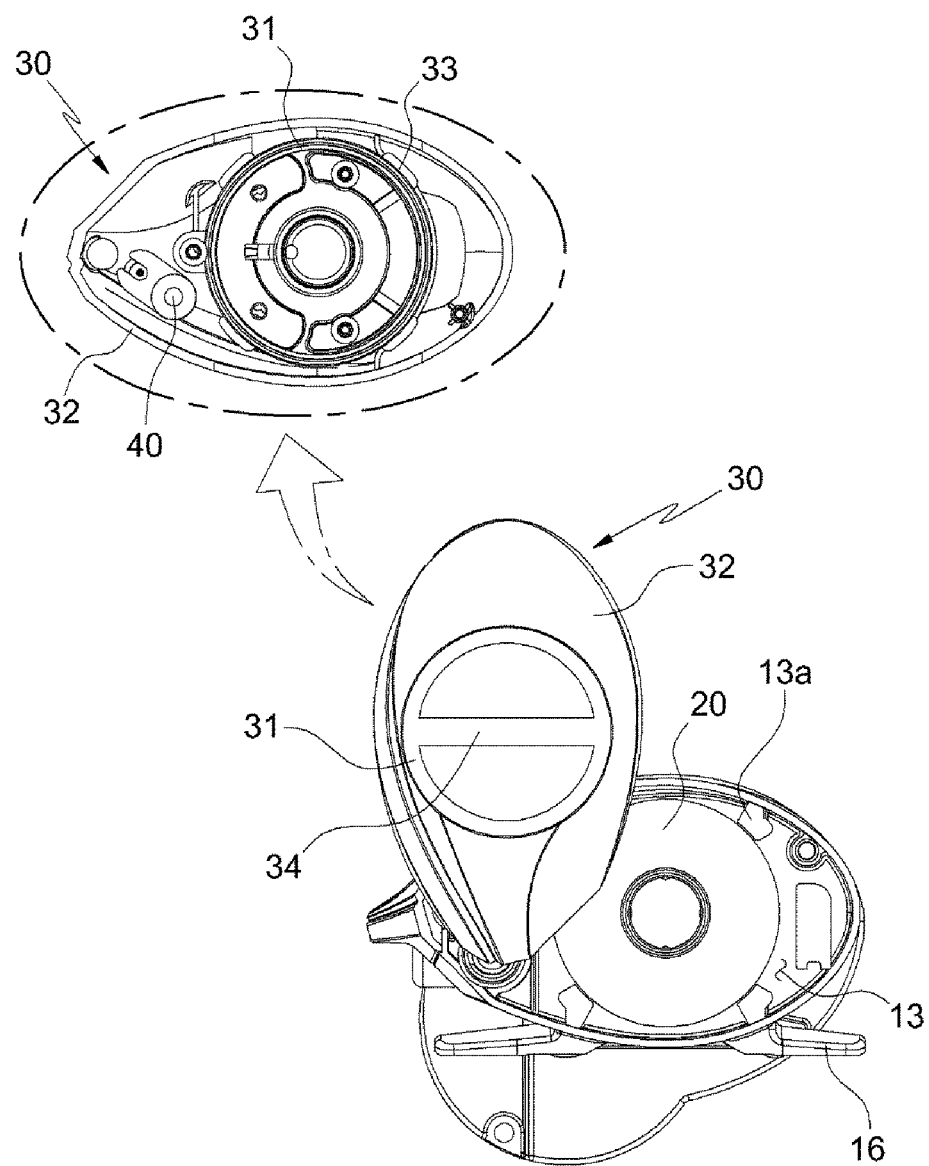
FIGS. 10 and 11A and 11B are plan views and side views illustrating a fishing reel according to a third embodiment of the present invention.

FIGS. 6A through 8B are plan views and side views illustrating the operation of the fishing reel according to the second embodiment of the present invention. FIG. 9 is a side sectional view showing opening completion conditions of the fishing reel according to the second embodiment of the present invention As shown in FIGS. 6A through 8B, in the fishing reel according to the second embodiment of the present invention, the second coupling part 13 to which the pillar 40 is coupled is provided in a rear end of the reel body 10.

In FIGS. 6A through 8B, detailed construction of the pushing part and the fishing line unwinding part (14, refer to FIG. 3A) is not illustrated to more clearly the core technology of the pillar 40. Those skilled in this art will easily understand the omitted construction.

In the second embodiment of the present invention, the pillar 40 is coupled to the second coupling part 13 provided on the rear end of the reel body 10. Thus, the cover assembly 30 including the side cover 32 is rotated around the pillar 40 on the rear end of the reel body 10 when conducting the first-extraction and second-rotation operation.

The pillar 40, the guide member 35 and the locking means which are disposed on the second coupling part 13 have the same constructions and operation as those of the first embodiment. Therefore, detailed explanation of these elements will be omitted.

As shown in FIG. 9, generally, when preparing fishing, the user orients the fishing rod such that the top of the fishing rod faces upwards. In the second embodiment of the present invention, because the pillar 40 is coupled to the second coupling part provided on the rear end of the reel body 10, when the cover assembly 30 completely opens, the cover assembly 30 rotates downwards, that is, towards the handle of the fishing rod, because of its own weight.

Thereby, the user can conveniently replace the spool with a new one or remove the spool for manipulation.

Hereinafter, a fishing reel having reliability in opening a side cover according to a third embodiment the present invention will be described in detail with reference to FIGS. 10A through 11B.

In the fishing reel according to the third embodiment of the present invention, the cover assembly 30 includes a grip part 34 coupled to the spool cover 31 and is configured such that as the grip part 34 first-rotates, the spool cover 31 is rotated around the shaft 21 of the spool 20.

In other words, when the grip part 34 first-rotates, only the spool cover 31 is rotated. After the locked state of the locking means is released by the first-rotation of the grip part 34, the cover assembly 30 moves in the lateral direction, that is, the first-extraction of the cover assembly 30 is conducted. Subsequently, the cover assembly 30 secondly rotates around the pillar 40 and opens.

For this, the locking means must not be provided on the side cover 32.

Therefore, in the third embodiment, the locking means includes a coupling protrusion 33 which is provided in the spool cover 31 or the coupling part 13 of the reel body 10, and a corresponding coupling member 13a to which the coupling protrusion 33 is coupled.

In the third embodiment of the present invention, because only the spool cover 31 rotates around the shaft 21 of the spool 20, the guide member 35 provided in the side cover 32 does not have to an arc shape. Accordingly, the manufacturing process can be facilitated, and the production cost can be reduced.

Furthermore, the grip part 34 of the spool cover 31 can be embodied in various shapes.

The grip part 34 is provided on a portion or the entire area of the spool cover 31 so that the user can grip and rotate spool cover 31.

Here, the grip part 34 preferably has a shape corresponding to the outer shape (refer to FIG. 11A and FIG. 11B) of the cover assembly 30.

Thereby, convenience of use can be enhanced, and diversity of selection in design can be provided to the manufacturer.

Figure 11A:
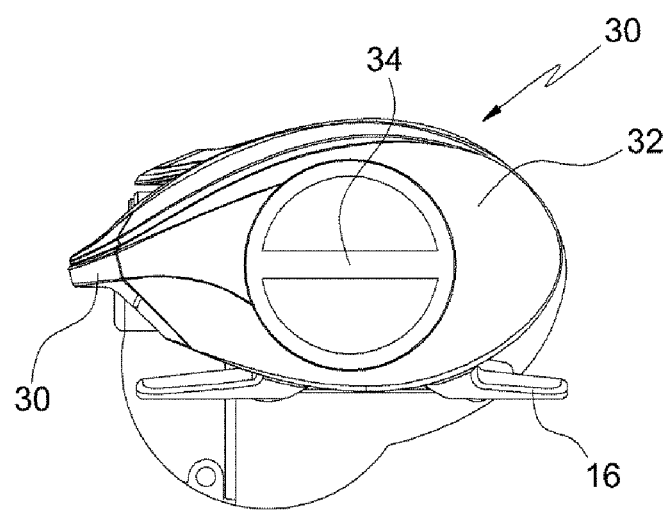
Figure 11B:
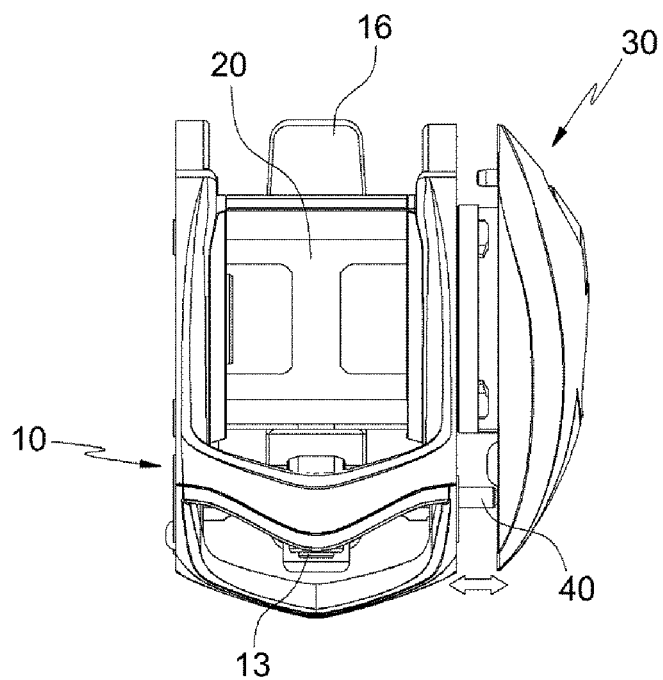

In FIGS. 10A and 11B, although the grip part 34 has a handle shape, crossing the spool cover 31, this is merely one of various embodiments of the grip part 34. That is, the grip part 34 can be embodied in various shapes. Those skilled in the art will easily appreciate that such various modifications, additions and substitutions are possible. The bounds of the present invention with regard to the grip part 34 must not be limited to special shapes.

Furthermore, in the fishing reel according to the third embodiment of the present invention, as shown in FIGS. 10A and 11B, although the pillar 40 has been illustrated as being provided on the front end of the reel body 10, the pillar 40 may be disposed on the rear end of the reel body 10 in the same manner as that of the second embodiment. This can also be easily embodied by those skilled in this art.

The explanation of the elements and element connection relation that pertain to the first-extraction and second-rotation operation of the fishing reel according to the third embodiment of the present invention is practically the same as that of the first embodiment. This can also be embodied by those skilled in this art, so that further detailed explanation will be omitted.

As described above, a fishing reel having reliability in opening a side cover according to the present invention includes a pillar which makes it possible for a cover assembly, which includes a spool cover and a side cover and is coupled to a reel body by a locking means, to be opened from a reel body in a first-extraction and second-rotation manner. Thereby, the cover assembly can be rotated without the hindrance by the shaft of a spool, so that the side cover can be easily opened. Furthermore, the pillar prevents the opened cover assembly from being removed from the reel body, whereby when spool replacement work or the like is conducted, the side cover can be prevented from being lost. As such, the present invention can ensure the reliability in opening of the side cover.

Further, in the fishing reel according to the present invention, the pillar has a telescopic structure. Thus, the manufacturing process can be facilitated, and space required for movement of the pillar is reduced. Therefore, the appearance of the fishing reel can be enhanced, thereby catering to consumers' diversified tastes.

In addition, the fishing reel according to the present invention includes a guide member which guides arc-movement of the pillar so that smooth rotation of the side cover becomes possible, thus improving convenience of use.

Moreover, in the fishing reel according to the present invention, a locking means, which includes a coupling protrusion and a corresponding coupling member to which the coupling protrusion is coupled, is provided on the spool cover or a first coupling part of the reel body. Thus, the coupling structure of the cover assembly is reliable. The fishing reel also includes a grip part which is configured such that only the spool cover can be rotated. Thereby, the user can more easily open the side cover.

Although the preferred embodiments of a fishing reel having reliability in opening a side cover according to the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fishing reel having reliability in opening a side cover, comprising:
   a reel body comprising a first shaft support part disposed at a first side, an opening formed at a second side, a first coupling part provided around the opening, a second coupling part provided around the opening, and a fishing line unwinding part disposed at a front side;
   a cover assembly fixed to the first coupling part of the reel body, the cover assembly comprising a spool cover provided with a second shaft support part, and a side cover coupled to the spool cover, the side cover covering the opening of the reel body;
   a spool installed in the reel body and provided with a shaft coupled at opposite ends thereof to the first and second shaft support parts, a fishing line being wound around the spool;
   a locking means to keep the side cover in a closed position covering the opening; and
   a pillar coupled to the second coupling part of the reel body to connect the reel body to the cover assembly, the pillar making it possible for the cover assembly to be extracted and then rotated in such a way that when a locked state of the locking means is released, the cover assembly is laterally moved towards the second side of the opening of the reel body and then rotated to be opened before being separated from the first coupling part of the reel body,
   wherein the pillar includes a plurality of pillar bodies coupled to each other in such a way that the pillar bodies are expanded and contracted in a telescopic manner, and
   the side cover of the cover assembly includes a guide member, so when the cover assembly is opened, the pillar performs a secondary lateral movement by a telescopic structure thereof after a primary lateral movement of the pillar is conducted.

2. The fishing reel as set forth in claim 1, wherein the cover assembly is configured such that the spool cover is rotated around the shaft of the spool by first-rotation of the side cover, and
   the cover assembly further comprises a guide member provided in the side cover, the guide member receiving the pillar and guiding arc movement of the pillar in response to the first-rotation of the side cover.

* * * * *